(12) United States Patent
Ungermann et al.

(10) Patent No.: US 7,848,361 B2
(45) Date of Patent: Dec. 7, 2010

(54) TIME-TRIGGERED COMMUNICATION SYSTEM AND METHOD FOR THE SYNCHRONIZATION OF A DUAL-CHANNEL NETWORK

(75) Inventors: Jörn Ungermann, Aachen (DE); Peter Fuhrmann, Aachen (DE)

(73) Assignee: NXP B.V., Eindhoven (NL)

( * ) Notice: Subject to any disclaimer, the term of this patent is extended or adjusted under 35 U.S.C. 154(b) by 435 days.

(21) Appl. No.: 10/557,637

(22) PCT Filed: May 10, 2004

(86) PCT No.: PCT/IB2004/050626

§ 371 (c)(1),
(2), (4) Date: Nov. 17, 2005

(87) PCT Pub. No.: WO2004/105278

PCT Pub. Date: Dec. 2, 2004

(65) Prior Publication Data

US 2006/0262814 A1 Nov. 23, 2006

(30) Foreign Application Priority Data

May 20, 2003 (EP) .................................. 03101433

(51) Int. Cl.
*H04J 3/06* (2006.01)
(52) U.S. Cl. ........................... 370/507; 370/377; 710/61
(58) Field of Classification Search ................. 370/252, 370/334, 464, 503
See application file for complete search history.

(56) References Cited

U.S. PATENT DOCUMENTS

| | | | | |
|---|---|---|---|---|
| 4,456,952 A * | 6/1984 | Mohrman et al. ............. 714/11 |
| 4,497,059 A * | 1/1985 | Smith ........................... 714/797 |
| 4,746,920 A * | 5/1988 | Nellen et al. ............... 340/825.2 |
| 4,774,709 A * | 9/1988 | Tulplue et al. ................. 714/4 |
| 4,974,144 A * | 11/1990 | Long et al. ................... 710/306 |
| 5,041,966 A * | 8/1991 | Nakai et al. .................. 713/375 |
| 5,117,442 A * | 5/1992 | Hall ............................. 375/356 |
| 5,131,084 A * | 7/1992 | Kasashima et al. .......... 713/375 |
| 5,146,585 A * | 9/1992 | Smith, III .................... 713/400 |
| 5,402,394 A * | 3/1995 | Turski .......................... 368/10 |
| 5,440,724 A * | 8/1995 | Boothroyd et al. ........... 714/733 |
| 5,805,870 A * | 9/1998 | Browning .................... 713/375 |
| 5,875,320 A * | 2/1999 | Gu ............................... 713/375 |
| 5,901,281 A * | 5/1999 | Miyao et al. .................. 714/11 |
| 5,918,040 A * | 6/1999 | Jarvis .......................... 713/375 |
| 6,052,753 A * | 4/2000 | Doerenberg et al. ......... 710/305 |
| 6,085,269 A * | 7/2000 | Chan et al. .................. 710/100 |
| 6,178,522 B1 * | 1/2001 | Zhou et al. ..................... 714/12 |

(Continued)

*Primary Examiner*—Ricky Ngo
*Assistant Examiner*—Ben H Liu

(57) ABSTRACT

A time-triggered communication system in a dual-channel network of singlechannel architecture, wherein in each case one communication controller (2, 6) is assigned to one channel, and two corresponding communication controllers (2, 6) communicate with one another via an inter-channel interface (1a, 1b). Said inter-channel communication contains information about limiting points (G1, G2 ... G12) of a time path. A limiting point (G1, G2 ... G12) is, for example, the point in time when a cycle starts. The interchange of limiting points enables the temporal offset of the two channels to be determined as well as a correction value. After every two cycles also the rate error of the local clocks can be ascertained and a suitable correction value determined. The reliability of safety-relevant networks is increased by the time-triggered communication system described hereinabove.

21 Claims, 3 Drawing Sheets

U.S. PATENT DOCUMENTS

Figure 1:
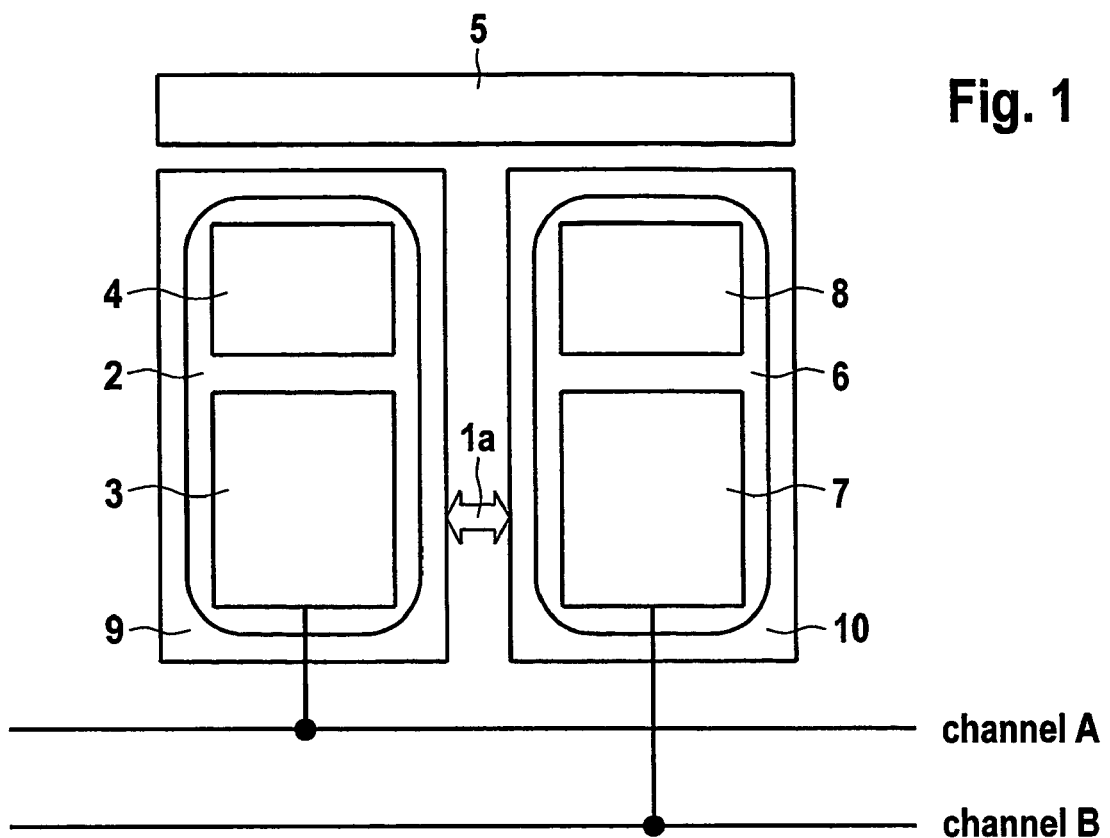

| | | | |
|---|---|---|---|
| 6,212,620 B1 * | 4/2001 | Kawasaki et al. | 712/32 |
| 6,216,236 B1 * | 4/2001 | Miyao et al. | 714/11 |
| 6,233,702 B1 * | 5/2001 | Horst et al. | 714/48 |
| 6,275,752 B1 * | 8/2001 | Giers | 701/29 |
| 6,467,003 B1 * | 10/2002 | Doerenberg et al. | 710/117 |
| 6,629,270 B1 * | 9/2003 | Ophir et al. | 714/43 |
| 6,654,356 B1 * | 11/2003 | Eidson et al. | 370/303 |
| 6,694,449 B2 * | 2/2004 | Ghameshlu et al. | 714/11 |
| 6,782,065 B1 * | 8/2004 | Yamanaka et al. | 375/356 |
| 6,842,808 B2 * | 1/2005 | Weigl et al. | 710/117 |
| 6,922,625 B2 * | 7/2005 | Weir et al. | 701/100 |
| 6,959,014 B2 * | 10/2005 | Pohlmeyer et al. | 370/514 |
| 7,085,959 B2 * | 8/2006 | Safford | 714/11 |
| 7,200,766 B2 * | 4/2007 | Furhrer et al. | 713/400 |
| 7,206,877 B1 * | 4/2007 | Doerenberg et al. | 710/100 |
| 7,260,652 B2 * | 8/2007 | Fuehrer et al. | 709/248 |
| 7,349,512 B2 * | 3/2008 | Rausch et al. | 375/356 |
| 7,493,517 B2 * | 2/2009 | Sugimoto | 714/11 |
| 7,505,400 B2 * | 3/2009 | Bibby et al. | 370/217 |
| 2003/0188222 A1 * | 10/2003 | Abbondanzio et al. | 714/12 |

* cited by examiner

TIME-TRIGGERED COMMUNICATION SYSTEM AND METHOD FOR THE SYNCHRONIZATION OF A DUAL-CHANNEL NETWORK

The invention relates to networks or communication systems comprising two channels and at least two nodes. The invention relates in particular to time-triggered communication systems.

Conventional architectures, where a single communication controller (CC) controls two channels are error-prone to the extent that a single error in this communication controller or complete failure thereof leads to faulty communication or deactivates the bus communication to both channels. Without additional error-reducing measures, a single faulty communication controller would be capable of precluding the communication on both channels by faulty transmission (so-termed Babbling Idiot).

In safety-relevant applications, data is transmitted in the dual-channel method to make sure, by means of redundancy, that the data sent twice arrives at least once at the recipient and is correctly processed there. As mentioned hereinabove, a single communication controller, which accesses two channels, cannot reach this degree of reliability as it might be subject to complete failure.

In a safety-relevant dual-channel network the same data is transferred on both channels and is checked for agreement by the host, consequently it is of decisive importance that the data communication should be synchronous. In this connection, the term "synchronous" is to be taken to mean that the data transmission on both channels is exactly simultaneous or time-shifted within a time window. As the communication controller falls back on the same clock generator for the data bus of each channel, the conformity in time is achieved.

A communication controller essentially comprises a controller-host interface, a protocol engine and a clock generator.

A typical fault-tolerant, time-triggered network consists of two channels to which communications nodes are connected. Each of these nodes consists of bus drivers, a communication controller, a host and finally, if necessary, a bus guardian device.

The bus driver transmits the bits and bytes, which are provided by the communication controller, to the connected channel, and provides the communication controller, in the proper order, with the information it receives on the channel. In a fault-tolerant network, the communication controller is connected with both channels, supplies relevant data to the host and receives data from the host, which it assembles, in the proper order, into frames and supplies to the bus driver.

Time-triggering or time control means that the time is sliced into periodic cycles. Each of these cycles consists of a plurality of segments. Each network node determines the start of a new cycle according to its own built-in clock generator. At least one segment is divided into a fixed number of slots. Each slot is allotted to exactly one communication controller, and only that communication controller has the right to transmit. Other segments of a cycle can be used for dynamic configuration or other purposes.

In a configuration set, the slots and the associated communication controllers are specified. An optional bus guardian with an independent set of configuration data enables the transmission on the bus only during these slots.

The host contains the data source and the data sink and generally does not take part in the activities of the bus protocol.

The communication system is started by a single node, the so-termed cold start node. This node is selected either by configuration or, if a plurality of nodes are available as cold start nodes, by the application of an algorithm, at the end of which a node remains. The communication controller of the selected cold start node must listen to both channels and transmit simultaneously all data for the cold start to both channels. Within a communication controller, only a single control logic for carrying out the cold start is available for both channels.

Each node listens to both channels. If a node receives a specific frame, which indicates the start of the communication, then it will take over the time schedule of the transmission observed and integrate it into its own system. Consequently, the two channels are substantially synchronous at the start of the network.

A distributed synchronization of the clocks, where the nodes are tuned to one another, is required because each node itself deduces the start of a cycle and hence the temporal order of all segments and time slots. Each node has its own, local clock in order to make sure that the communication system does not depend on a single master clock whose failure would collapse the entire network. The difference between the own local clock and the local clocks of other participating nodes of the network, which are all synchronization nodes, is used to correct the own local clock in a fault-tolerant manner.

The local clocks can be corrected in two ways, i.e. correction of the time shift and correction of the clock rate. The clock rate correction also tries to equalize the various clock rates in the system, i.e. it tries to bring the clock rates closer together. The time shift is customarily reduced by correcting the local clocks at the end of a cycle or, if it is additionally necessary to reduce the clock rate error, at the end of a two-cycle time period since two measurement values are necessary to calculate the clock rate deviation.

In the system which is not controlled by a master, the nodes themselves remain synchronized with respect to each other by a distributed, error-free algorithm.

The system described here for starting a communication system corresponds, for example, to "TTP/C Specification", Version 0.5, Edition 0.1, 21 Jul. 1999, TT Tech Computertechnik AG; http://www.ttech.com; or to the "FlexRay Requirements Specification", Version 2.0.2, April 2002, FlexRay, Consortium; www.flexray.com.

It is an object of the invention to provide a time-triggered dual-channel network of the type described in the opening paragraph, which has been developed further in respect of fault-tolerance. A further object of the invention is to provide a method for the synchronization of a time-triggered dual-channel network of the type described above.

This object is achieved in accordance with the invention by a time-triggered communication system comprising at least two channels (A, B) and at least a first and a second node, wherein a first communication controller is assigned to the first channel and a second communication controller is assigned to the second channel, the first and the second communication controller each have a local clock, said two local clocks being physically separated, an interface for the inter-channel communication is arranged between the first communication controller and the second communication controller.

The expression "physically separated" means that although the two local clocks may be pulsed by one and the same oscillator, they may still deviate from each other due to asynchronous start-up or delays at the intrachannel communication.

The single-channel architecture described herein means that each of the two channels is driven, at one or more nodes of the communication system, by a communication controller assigned to it. If two communication controllers operate in parallel, i.e. in each case one communication controller is assigned to one of two channels, on which redundant information is transmitted which is compared by recipients, it is essential that the data are transmitted so as to be in temporal conformity. It cannot be ensured, however, that the two clock generators of the two communication controllers are synchronous since the distributed, fault-free, synchronization algorithm can only maintain the synchronism of the communication controllers of one channel as it does not have information about the other channel. This is the reason why there is an interface for the inter-channel communication between the two communication controllers. Inter-channel communication means, in this case, that information regarding the two channels is exchanged between the first and the second communication controller. The first and the second communication controller jointly form a node.

The invention describes how two channels being substantially balanced in temporal conformity channels can be "pulled closer together" to the effect that the temporal offset is reduced, i.e. the channels are synchronized. Using the measures described hereinabove, exact synchronism of the two channels cannot be achieved because the data exchange via the interface for the inter-channel communication causes a delay, however small. In this connection, the term "synchronous" means: in temporal conformity.

The inter-channel communication consists of an information exchange regarding specific limiting points of the respective time path of the first and the second communication controller. Said specific limiting points are preferably the time points at the beginning of a cycle on the associated channel.

In accordance with a preferred embodiment the first and the second communication controller comprise means for receiving and for processing information regarding said limiting points. Said means include, for example, a controller, a memory (RAM) and an energy supply.

In accordance with an embodiment of the invention both communication controllers are arranged on a common chip, and the interface is also integrated on this chip. This gives the advantage that only one housing must be mounted and electrically contacted.

In accordance with yet another embodiment both communication controllers are each arranged on a chip of their own and the interface is externally arranged. As a result, the fault domain "common chip" is omitted. In the case of, for example, an overvoltage fault possibly one of the two chips remains undamaged. As a result, the network would be functioning on one channel.

The object of the invention is also solved by a method of synchronizing a dual-channel network which includes two channels and at least one node, comprising the steps of transmitting a first limiting point to the first communication controller via an inter-channel interface at the beginning of a cycle on the second channel, receiving the first limiting point, transmitting a second limiting point to the second communication controller at the beginning of a cycle on the first channel, determining a first temporal difference between the first limiting point and the second limiting point, and generating a first and a second correction value in dependence on the first temporal difference for each of the two local clocks of the first and the second channel.

The method described herein corrects the temporal offset between the local clocks.

By virtue of the fact that two communication controllers are available, the fault protection is increased. They communicate via a common interface, so that an information exchange regarding the current time path or the local clock time takes place.

The temporal difference is determined, for example, by subtracting the first limiting value from the second limiting value. A correction value for the temporal offset between the two local clocks is preferably formed by a function $f(x)$, where $x=(\text{Delta } i)/2$. By virtue of this function f it is achieved that the temporal difference enters only proportionally in the correction value, so that individual deviations (which may or may not be caused by errors) in extreme cases only have a small effect on the synchronization of the communication controller inside a channel.

The synchronization method is continued in the direction of a loop starting at the next cycle (cycle i+1) with a third limiting value of the channel B and a fourth limiting value of the channel A.

The object is achieved in accordance with the invention by a method which, besides the temporal drift between the local clocks, also takes account of any errors of the respective clock rates. Compensation of the clock rate errors can take place only after completion of two cycles, since two measurements, ideally spaced one cycle apart, are required to measure the rate.

In an embodiment of the invention, the correction value for the temporal offset between the two local clocks is formed by a function $f(x)$, where $x=(\text{Delta } i)/2$ and/or the correction value for the clock rate error is formed by a function $g(y)$, where $y=((\text{Delta } i+1)-(\text{Delta } i))/(2*\text{cycle length})$.

Two examples, which are non-limitative, are shown for the function $f(x)$ and are transferable to $g(y)$:

a) $f(x)=x$ for $abs(x)<c$, $f(x)=x-sgn(x)c$ for $abs(x)>=c$, where c=constant b) $f(x)=sgn(x)*min(abs(x),c)$, where c=constant.

The function $f(x)$ is intended to limit the influence of the inter-channel synchronization, i.e. between the two channels, such that the intra-channel synchronization, i.e. on one channel, remains intact, which means that the distributed algorithm is only disturbed, not destroyed. By virtue of the functions f and g it is achieved that the temporal difference enters only proportionally in the correction value, so that individual deviations (which may or may not be caused by errors) in an extreme case have only a small effect on the synchronization of the communication controller within a channel.

Next, a description is given of examples for the formation of the correction value, which do not limit the scope of the invention:

1) Division of the temporal difference by a constant factor, for example 2, in accordance with a so-termed dead-beat control.

2) Division of the temporal difference by a constant factor and, in addition, limitation of the maximum absolute value of the correction value by another constant, for example 1 or 2, corresponding to a so-termed threshold application.

3) Division of the temporal difference by a constant factor and subsequent subtraction of an amount, which depends on the absolute amount of the difference. For example, if the result of the division of the difference by the constant factor of 2 exceeds 4, then the value 4 is subtracted therefrom and the result of the subtraction is applied, corresponding to a so-termed dampening application.

4) Combination of individual examples or a plurality of said examples to generate the correction value.

The inter-channel difference is reduced by applying the correction values generated as described above, if said inter-channel difference is greater than the intra-channel accuracy.

By applying said mechanisms, the maximum difference between any of the single-channel communication controllers in the system is limited by a specific value which depends on the function for generating the correction value.

The mechanism described herein may also be used for the synchronization of a communication controller and the associated bus guardian. In that case, the bus guardian must be supplied with a comparatively high frequency.

In a variant, the transit time delay via the interface for the transmission of a limiting value is known or estimated, and compensated by adaptation of the correction values.

A node is formed by two equivalent, corresponding communication controllers, therefore it lies within the scope of the invention that the sequence is reversed, and the method starts with the first channel.

The dual-channel network with inter-channel communication in accordance with the invention is preferably used as a communication system in a motor vehicle control, where it is used to control safety-relevant processes.

These and other aspects of the invention are apparent from and will be elucidated with reference to the embodiment(s) described hereinafter.

Figure 2:
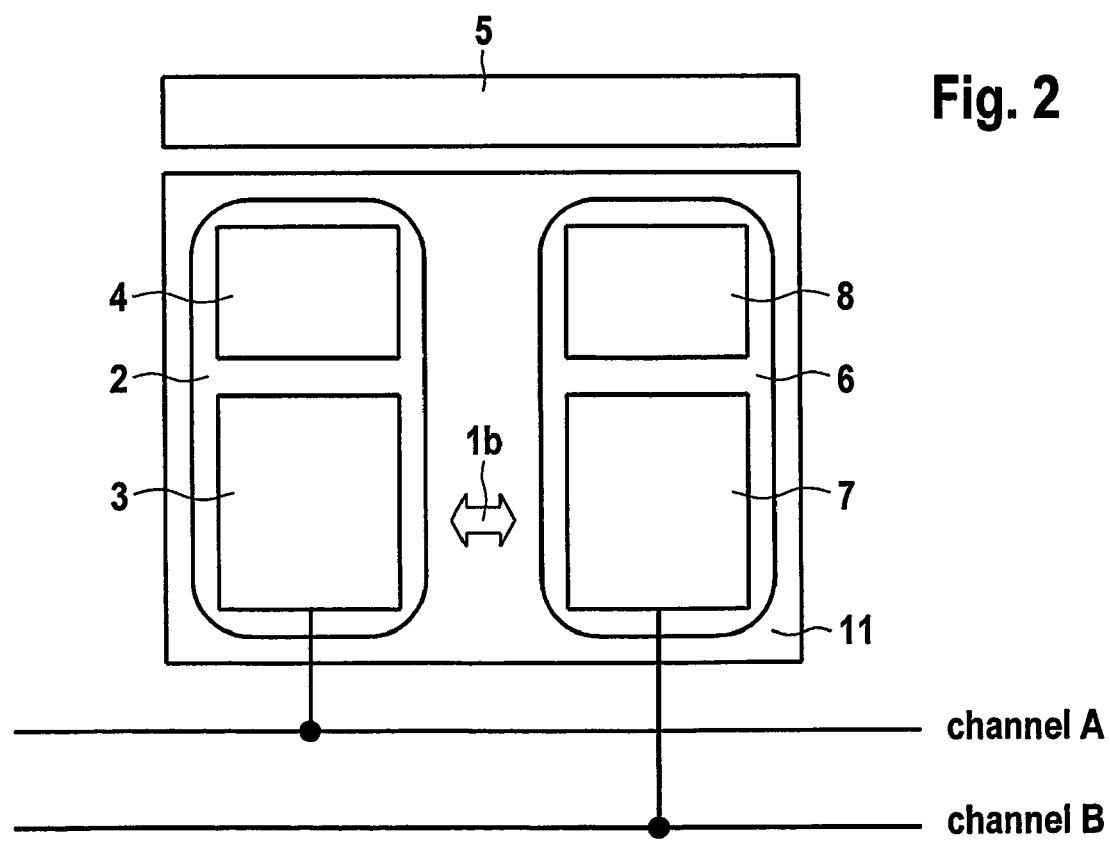
Figure 3:
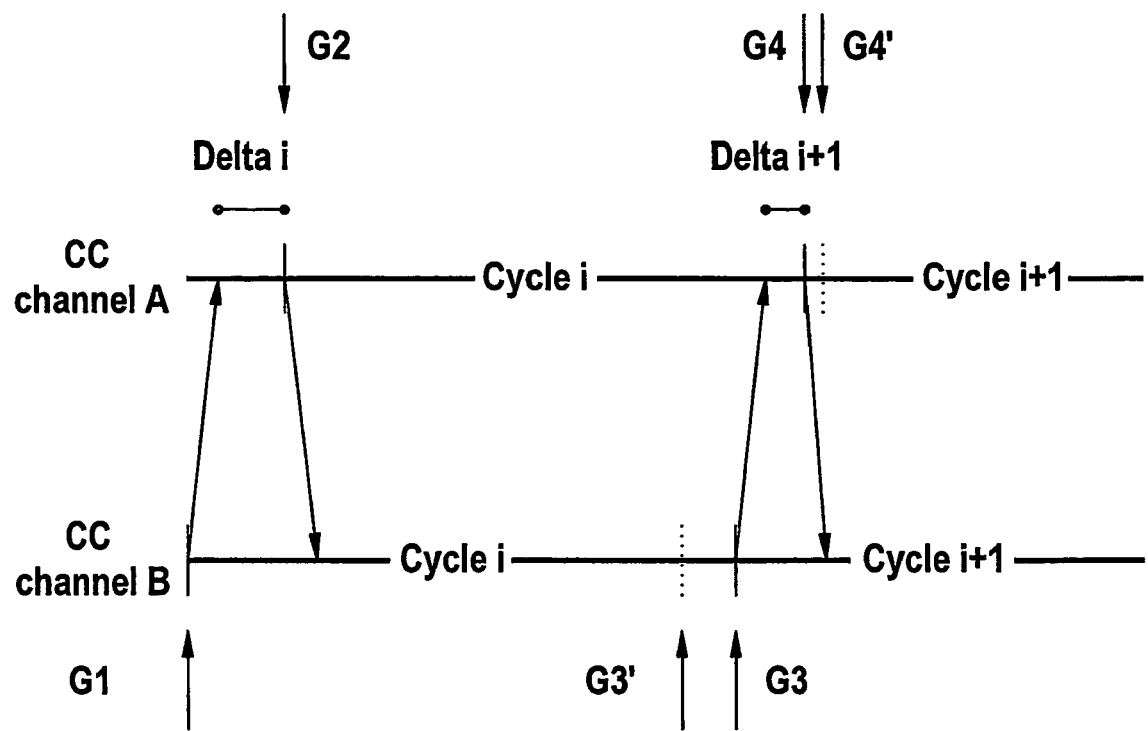
Figure 4:
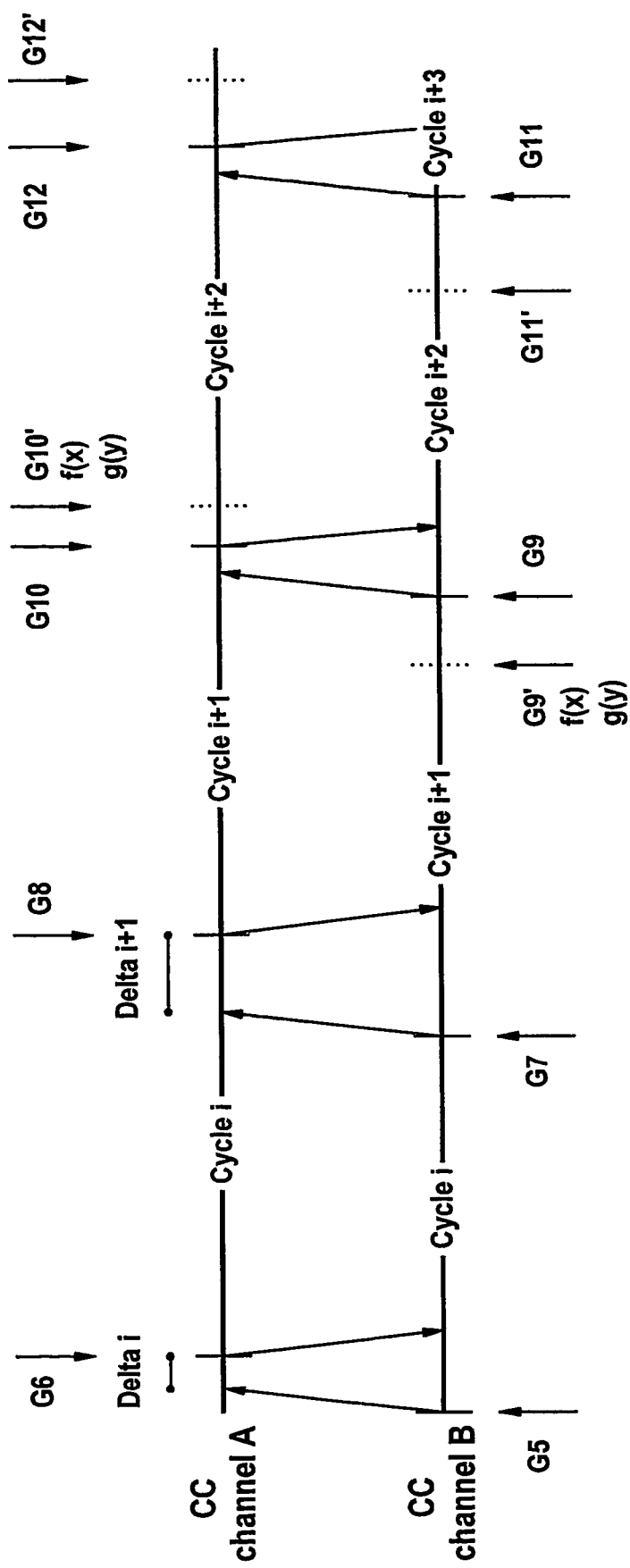

In the drawings:

FIG. 1 shows an example of a single-channel architecture with external interface, FIG. 2 shows an example of a single-channel architecture with an interface integrated on the chip, FIG. 3 is a time diagram of a first variant of an inter-channel synchronization, and FIG. 4 shows a time diagram of a second variant of an inter-channel synchronization.

FIG. 1 shows an example of a single-channel architecture with an external interface 1a. The first communication controller 2 comprises at least one protocol engine 3 and an interface 4 between the communication controller 2 and a host 5. The first communication controller 2 sends and receives on channel A of a dual-channel network, that is not shown in further detail.

The second communication controller 6 comprises at least one protocol engine 7 and an interface 8 between the communication controller 6 and a host 5. The second communication controller 6 sends and receives on channel B of a dual-channel network, that is not shown in further detail.

The first and the second communication controller 2, 6 are each arranged on a separate first and second chip 9, 10, respectively. Local inter-channel communication takes place via the external interface 1a. The example shown in FIG. 1 presents a complete doubling in comparison with a customary communication controller of dual-channel architecture. This example has the advantage that in the event of failure of one chip, it is very probable that the other chip is undamaged and hence at least one of the two communication controllers operates correctly.

FIG. 2 shows an example of a single-channel architecture, where an interface 1b is integrated on the chip. The first communication controller 2 comprises at least one protocol engine 3 and an interface 4 between the communication controller 2 and a host 5. The first communication controller 2 sends and receives on channel A of a dual-channel network, that is not shown in more detail.

The second communication controller 6 comprises at least one protocol engine 7 and an interface 8 between the communication controller 6 and a host 5. Said second communication controller 6 sends and receives on channel B of a dual-channel network, that is not shown in greater detail.

The first and the second communication controller 2, 6 are both arranged on a common chip 11. Local inter-channel communication takes place via the interface 1b integrated on this chip 11. The example shown in FIG. 2 presents a reduced duplication in comparison with a customary communication controller of dual-channel architecture. This example has the advantage that it requires only one housing to be mounted.

FIG. 3 shows a time diagram of a first variant of an inter-channel synchronization. The upper time path relates to the communication controller 2 for the first channel A, the lower time path relates to the communication controller 6 for the second channel B. In this example, it is the second channel B that starts the communication process, i.e. the cycle starts earlier than that of the first channel A. A cycle is bounded by the limiting points G1 and G3 or G2 and G4, with the rear limiting points representing at the same time the start of the next cycle (cycle+1). The temporal offset Delta i is formed by the difference between the limiting points G2 and G1. Subsequently, a correction value is generated for each channel by a function f(x), where x=(Delta i)/2. After completion of a cycle and after the correction values have been applied, the specified limiting points G3 and G4 have come closer to each other. This is shown by dotted lines representing theoretical limiting points G3' and G4'. The actual limiting points G3 and G4 demonstrate increased conformity with each other; in this case (Delta i+1)<(Delta i).

This variant is preferably used for clocks driven by a high-precision quartz having an error of 10 to 50 ppm.

FIG. 4 shows a time diagram of a second variant of an inter-channel synchronization. In this variant, the correction values are not applied until after two cycles since in order to determine the clock rate error, also the length of the cycle must be determined. The temporal offset Delta i is formed, also in this case, by the difference between the limiting points G2 and G1. Subsequently, a correction value is generated for each channel by a function f(x), where x=(Delta i)/2. At the start of the second cycle (cycle+1) the next limiting points G7 and G8 are interchanged. The correction value for the clock rate error is formed by a function g(y), where y=((Delta i+1)-(Delta i))/(2*length of cycle).

This embodiment is preferably employed in communication systems with a low data rate, long cycles or poor quartzes.

In summary, the invention relates to a time-triggered communication system in a dual-channel network of single-channel architecture, wherein in each case one communication controller (2, 6) is assigned to one channel, and two corresponding communication controllers (2, 6) communicate with one another via an inter-channel interface (1a, 1b). Said inter-channel communication contains information about limiting points (G1, G2 . . . G12) of a time path. A limiting point (G1, G2 . . . G12) is, for example, the point in time when a cycle starts. The interchange of limiting points enables the temporal offset of the two channels to be determined as well as a correction value. After every two cycles also the rate error of the local clocks can be ascertained and a suitable correction value determined. The reliability of safety-relevant networks is increased by the time-triggered communication system described hereinabove.

The invention claimed is:

1. A time-triggered communication system comprising:
   at least first and second channels and at least a first node and a second node that are communicatively coupled by the first and second channels;
   a first communication controller assigned to the first channel and a second communication controller assigned to the second channel, the first and the second communication controller each having a local clock, said two local clocks being physically separated; and an interface configured for inter-channel communication consisting of an information exchange regarding specific limiting points of respective time paths of the first and the second communication controllers, and arranged between the first communication controller and the second communication controller, wherein the second communication controller is configured to transmit a first limiting point to the first communication controller via the inter-channel interface at a start of a cycle on the second channel, the first communication controller is configured to transmit a second limiting point to the second communication controller via the inter-channel interface at a start of the cycle on the first channel, and the local clocks of the communication controllers are synchronized based on a temporal difference between the first and second limiting points.

2. A time-triggered communication system as claimed in claim 1, characterized in that the inter-channel communication consists of an information exchange regarding specific limiting points of respective time paths of the first and the second communication controller.

3. A time-triggered communication system as claimed in claim 1, characterized in that the first and the second communication controller receive and process information regarding said specific limiting points.

4. A time-triggered communication system as claimed in claim 1, characterized in that both of the communication controllers are arranged on a common chip, and the interface is also integrated on the common chip.

5. A time-triggered communication system as claimed in claim 1, characterized in that the communication controllers are each arranged on a chip of their own and the interface is arranged externally to the chips.

6. The use of a time-triggered communication system with inter-channel communication as claimed in claim 1 in a motor vehicle control device.

7. A time-triggered communication system as claimed in claim 1, wherein the second communication controller is configured to transmit the first limiting point only to the first communication controller and the first communication controller is configured to transmit the second limiting point only to the second communication controller.

8. A method of synchronizing a dual-channel network that includes first and second channels, first and second nodes that are communicatively coupled by the first and second channels, a first communication controller having a local clock and assigned to the first channel, a second communication controller having a local clock and assigned to the second channel, and an inter-channel interface arranged between the communication controllers and configured for inter-channel communication consisting of an information exchange regarding specific limiting points of respective time paths of the communication controllers, the method comprising:

transmitting a first limiting point to the first communication controller via the inter-channel interface at a beginning of a cycle on the second channel, receiving the first limiting point, transmitting a second limiting point to the second communication controller via the inter-channel interface at a beginning of the cycle on the first channel, determining a first temporal difference between the first limiting point and the second limiting point, and generating a first and a second correction value in dependence on the first temporal difference for the local clocks of the first and second communication controllers.

9. A method as claimed in claim 8, characterized in that a transit time delay for transmission of a limiting value is known or estimated, and compensated by adaptation of the correction values.

10. A method as claimed in claim 8, wherein the first limiting point is transmitted only to the first communication controller and the second limiting point is transmitted only to the second communication controller.

11. A method of synchronizing a dual-channel network that includes first and second channels, a first communication controller having a local clock and assigned to the first channel, a second communication controller having a local clock and assigned to the second channel, an inter-channel interface arranged between the communication controllers, and at least one node, the method comprising:

transmitting a first limiting point to the first communication controller via the inter-channel interface at a beginning of a cycle on the second channel, receiving the first limiting point, transmitting a second limiting point to the second communication controller via the inter-channel interface at a beginning of the cycle on the first channel, determining a first temporal difference between the first limiting point and the second limiting point, and generating a first and a second correction value in dependence on the first temporal difference for the local clocks of the first and second communication controllers, characterized in that a correction value for a temporal offset between the two local clocks is formed by a function $f(x)$, where x=(the first temporal difference)/2.

12. A method of synchronizing a dual-channel network that includes first and second channels, a first communication controller having a local clock and assigned to the first channel, a second communication controller having a local clock and assigned to the second channel, an inter-channel interface arranged between the communication controllers, and at least one node, the method comprising:

transmitting a first limiting point to the first communication controller via the inter-channel interface at a beginning of a cycle on the second channel, receiving the first limiting point, transmitting a second limiting point to the second communication controller via the inter-channel interface at a beginning of the cycle on the first channel, determining a first temporal difference between the first limiting point and the second limiting point, and generating a first and a second correction value in dependence on the first temporal difference for the local clocks of the first and second communication controllers, characterized in that the synchronization method is continued in a direction of a loop starting at a next cycle with a third limiting value and a fourth limiting value.

13. A method of synchronizing a dual-channel network that includes first and second channels, a first communication controller having a local clock and assigned to the first channel, a second communication controller having a local clock and assigned to the second channel, an inter-channel interface arranged between the communication controllers, and at least one node, the method comprising:

transmitting a first limiting point to the first communication controller via the inter-channel interface at a start of a cycle on the second channel, receiving the first limiting point, transmitting a second limiting point to the second communication controller via the inter-channel interface at a start of the cycle on the first channel, determining a first temporal difference between the first limiting point and the second limiting point, transmitting a third limiting point to the first communication controller via the inter-channel interface at a start of a next cycle on the second channel, receiving the third limiting point, transmitting a fourth limiting point to the second communication controller via the inter-channel interface at a start of the next cycle on the first channel, determining a second temporal difference between the third limiting point and the fourth limiting point, and generating first, second, third and fourth correction values in dependence on the first temporal difference and/or in dependence on the second temporal difference for the local clocks of the first and second communication controllers.

14. A method as claimed in claim 13, characterized in that a correction value for a temporal offset between the two local clocks is formed by a function f(x), where x=(the first temporal difference)/2 and/or a correction value for a clock rate error is formed by a function g(y), where y=((the second temporal difference)-(the first temporal difference))/(2*cycle length).

15. A device for a time-triggered communication system that includes first and second channels that communicatively couple the device to a further device, the device-comprising:

a first communication controller having a local clock and assigned to the first channel;

a second communication controller having a local clock and assigned to the second channel, the local clocks of the communication controllers being physically separated from each other; and an interface configured for inter-channel communication consisting of an information exchange regarding specific limiting points of respective time paths of the first and the second communication controllers, and arranged between the first communication controller and the second communication controller, wherein the second communication controller is configured to transmit a first limiting point to the first communication controller via the inter-channel interface at a start of a cycle on the second channel, the first communication controller is configured to transmit a second limiting point to the second communication controller via the inter- channel interface at a start of the cycle on the first channel, and the local clocks of the communication controllers are synchronized based on a temporal difference between the first and second limiting points.

16. A device as claimed in claim 15, characterized in that both of the communication controllers are arranged on a common chip and the interface is also integrated on the common chip.

17. A device as claimed in claim 15, characterized in that the communication controllers are each arranged on a chip of their own and the interface is arranged external to the two chips.

18. A device as claimed in claim 15, further comprising:
means for transmitting a limiting point;
means for receiving a limiting point;
means for determining a temporal difference between two limiting points, and means for generating at least one correction value for each of the two local clocks in dependence on the determined temporal difference.

19. A motor vehicle control comprising a device as claimed in claim 15.

20. A device as claimed in claim 15, wherein the second communication controller is configured to transmit the first limiting point only to the first communication controller and the first communication controller is configured to transmit the second limiting point only to the second communication controller.

21. A program storage medium, comprising:

a processor-readable storage device configured with instructions for synchronizing a dual-channel network that includes first and second channels, first and second nodes that are communicatively coupled by the first and second channels, a first communication controller having a local clock and assigned to the first channel, a second communication controller having a local clock and assigned to the second channel, and an inter-channel interface arranged between the communication controllers and configured for inter-channel communication consisting of an information exchange regarding specific limiting points of respective time paths of the first and the second communication controllers, wherein execution of the instructions by a processor causes the processor to perform operations including:

transmitting a first limiting point to the first communication controller via the inter-channel interface at a beginning of a cycle on the second channel, receiving the first limiting point, transmitting a second limiting point to the second communication controller via the inter-channel interface at a beginning of the cycle on the first channel, determining a first temporal difference between the first limiting point and the second limiting point, and generating a first and a second correction value in dependence on the first temporal difference for the local clocks of the first and second communication controllers.

* * * * *